March 24, 1964 F. FALLA 3,125,946
FOOD AND BEVERAGE COOKER
Filed May 23, 1960 2 Sheets-Sheet 1
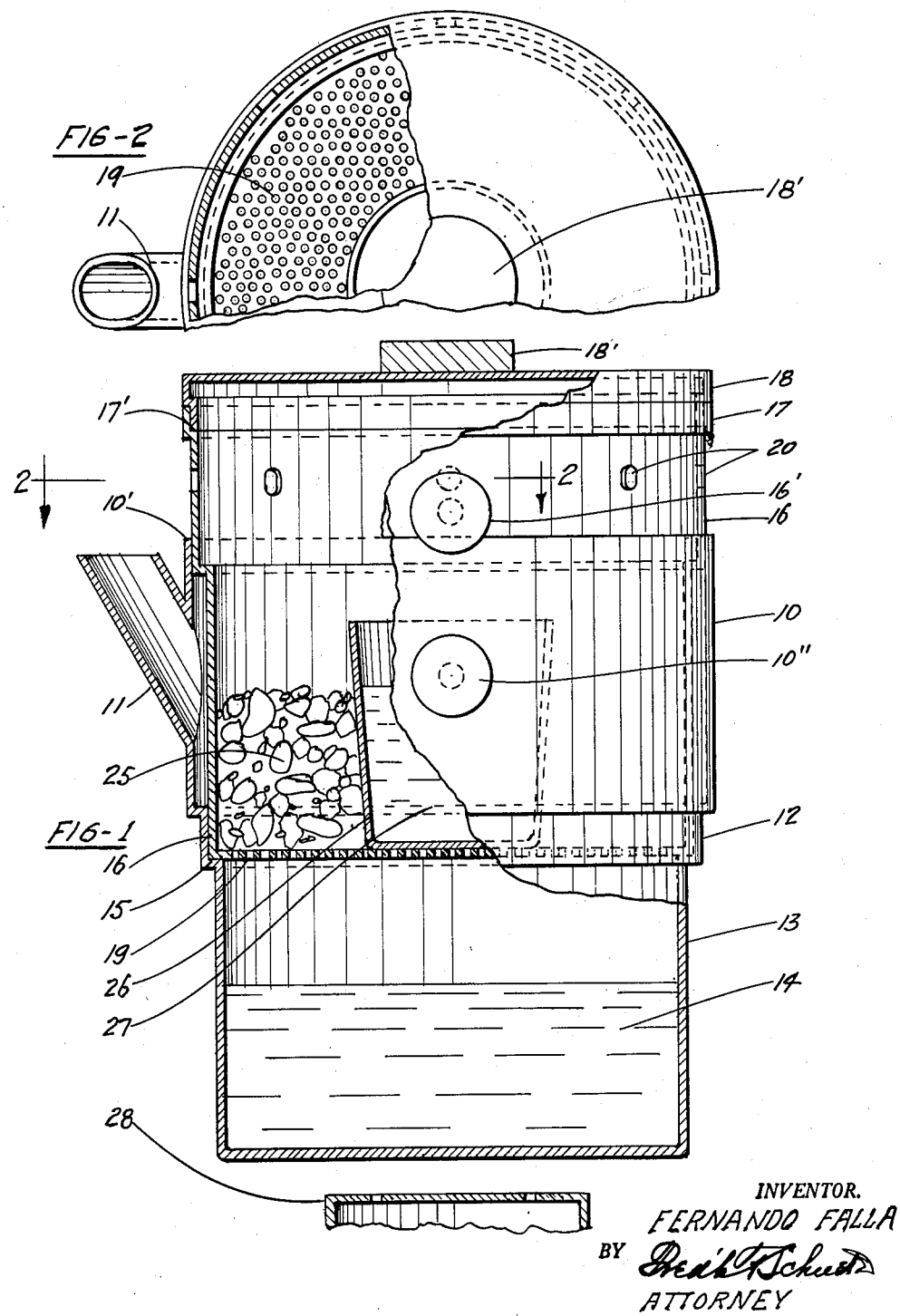
INVENTOR.
FERNANDO FALLA
BY
ATTORNEY

United States Patent Office 3,125,946
Patented Mar. 24, 1964

3,125,946
FOOD AND BEVERAGE COOKER
Fernando Falla, 59 Elm St., Millburn, N.J.
Filed May 23, 1960, Ser. No. 30,870
6 Claims. (Cl. 99—342)

The invention relates to a novel cooking method and apparatus for the preparation of foods—solid and liquid, or the re-heating of the same, for human consumption; also, to a method whereby the cooking operation may be effected, if desired, at temperatures substantially in excess of the temperature of boiling water.

It has for an object not only to expedite such cooking operation but so to conduct the same as to enhance the result.

A further object of the invention is to provide a cooker wherein a number of different foods may be processed simultaneously.

Still another object is to provide, for the application to the charge, heat at temperatures in excess of the temperature of boiling water.

A still further object of the invention is to utilize as the heating medium vaporized water, or edible, vaporizable material which is applied then to the food in a novel manner.

In carrying out the invention, a suitable container or open-vessel is provided, the same being adapted for the retention of the vaporizable material in its lower portion; and a perforated food-supporting unit is associated in a novel manner removably therewith above the vaporizable material, whereby to expose the food to vapors arising from and directed to the food—the condensation returning then to the bottom of the container for re-evaporation.

The nature of the invention, however, will best be understood when described in connection with the accompanying drawings, in which:

FIG. 1 is a vertical section through the novel cooker and an associated burner; and illustrates the novel construction and manner of conducting the cooking operation therewith.

FIG. 2 is a fragmentary plan view thereof, with a portion broken away, and food omitted.

Figure 3:
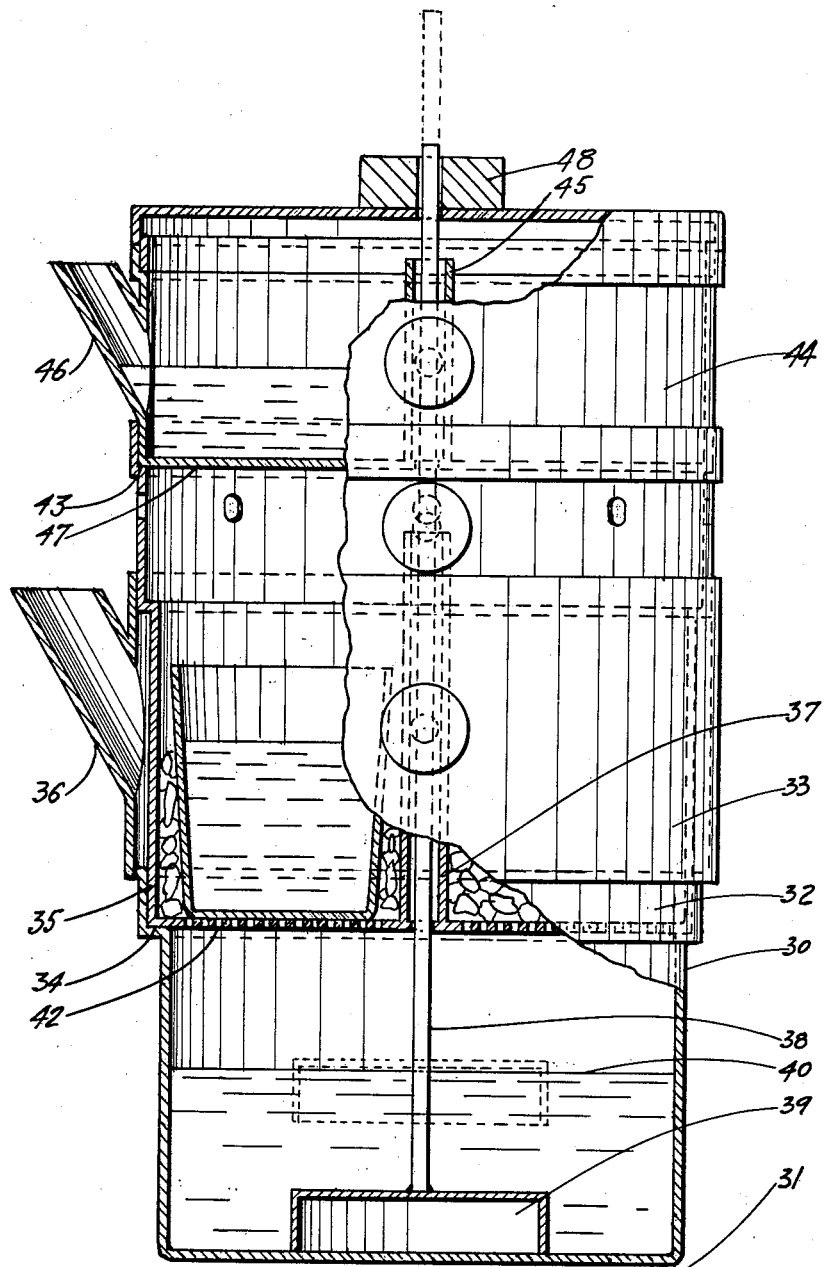
FIG. 3 is a view similar to FIG. 1, and illustrates a modification.

Referring to the drawings, more particularly to FIGS. 1 and 2 thereof, the novel cooker is indicated as comprising an open-top vessel, for example, preferably of cylindrical conformation; and the uppermost portion 10 of which is of maximum diameter, and provided with an outlet spout 11 and a handle 10", for manipulation of the vessel. Below said spout it is of reduced diameter, as is indicated by the portion 12; and slightly below, it is again reduced in diameter to form the bottom portion 13 of the vessel. The latter is designed to retain the vaporizable material, as is indicated at 14; and, in the particular embodiment shown, is water. Such reduction, moreover, affords a circular inner seat 15 for supporting removably a cooking unit 16 provided with a manipulation handle 16'. The latter unit, however, projects beyond the upper edge 10' of the vessel, as is indicated; and is increased in diameter at the outer end to afford a portion 17 designed to provide a seat 17' for support of a cover member 18 sealing more or less said cooking unit thereat. The cover is provided, also, with a knob 18' for ready removal of the said cover member. The only exit then for vapors arising from the water 14 will, when the cooker is in service, be through perforations 19 of the bottom of said cooking unit 16. These perforations are to be of relatively small diameter, say 1/16th of an inch, to cause the food to be retained by the cooking unit, yet allow of relatively free passage of the vapor. The said cooking unit, moreover, is provided with exit openings, as the vents 20, at its upper portion for venting the cooker to the atmosphere.

The various items to be cooked and/or brewed, are preferably first distributed over the perforated bottom portion, for example, as loose food portions 25 and/or within one or more suitable containers such as the cup 26, as in instances where liquids 27 are involved, for example in the stewing of foods and the like. The water, or other vaporizable material is then supplied in the required volume to the bottom portion 13 of said vessel.

Upon application of heat to the bottom portion 13 of said vessel by means, for example, of a conventional burner 28 located beneath the cooker, vapor will be caused to ascend through said cooker. This rising vapor will then not only heat the bottom of the unit 16 but will pass through its perforations 19 to convey heat to the portions 25 as well as to the liquid 27 in cup 26; and, finally, will escape at the top of the unit through the vents 20.

In the case of rapid, short-time cooking of food such as, for example, corn-on-the-cob, asparagus, peas, string beans, cauliflower, carrots, potato slices and other vegetables, the described unit it particularly suitable. It is to be noted, furthermore, that the initially highly heated vapor escapes eventually through the vents 20; and that in the initial stage of the cooking operation a certain amount of condensation of the vapor occurs on contact with the relatively cool food. Such initial condensation is particularly desirable in that not only is the proper moisture content of the food assured, but the same is provided differently than when food is totally immersed in water—which is the general practice.

Moreover, only a relatively short time—generally less than ten minutes—is required for the steaming action; and the full flavor of the food is retained.

Also, since not only is the air generally excluded thereby from contact with said food during the cooking, but the latter is conducted with saturated steam which has a specific heat of more than twice that of air. The transfer of the surrounding heat to the food thus is more than twice that of heated air, as in an oven.

Under the novel process, the beginning of the cooking operation is by condensation of steam until the food has reached the steam temperature; and, since the latent heat of evaporation of steam at atmospheric pressure is very large—970.4 B.t.u. per pound, and the heat transfer, in condensation, is the largest known, viz. 600 B.t.u. per square foot per hour, it follows that the heating is effected very rapidly. Consequently the cooking rate can be noticeably increased without any danger of burning the food—the steam temperature remaining constant—at sea level, 212° F.

Thus, any container placed on top of the perforated intermediate bottom will receive the action of the vapors both on the outside as well as within said container. As an example, in the cooking of apples for the preparation of apple sauce, the peeled apple in small sections is placed within the cup 26; and, by subjecting it then to less than ten minutes' steaming, said apple sections will have become thoroughly cooked so that only a slight effort of mashing and the addition of the desired quantity of sugar will afford the sauce in about ten minutes. Present methods, it is to be noted, generally require an hour or more. The same applies to the cooking of eggs, as a further example. The cracked egg will be drained then on top of a lump of butter (both not shown) in the bottom of a cup, and subjected to from seven to ten minutes of the steam, in accordance with the personal taste of the consumer of the cooked egg.

Likewise, various light vegetables such as asparagus, string beans, carrots, etc. can be cooked within a cup, with the result that their natural flavors are retained since the cooking is effected out of contact with any water or liquid.

However, in connection with the cooking of foods requiring higher temperatures, for example, in the preparation of a meat roast which is normally cooked in its own gravy, as well as subsequently re-heated therein, it will be evident that a liquid having a substantially higher vaporization temperature must be utilized. Thus, edible media such as olive oil, lard, bacon drippings, lamb fat, Crisco, etc. may be utilized as the material to be vaporized in furnishing the desired degree of heat to the food to be cooked.

Such medium is then to be placed, similarly as in the case of the hereinbefore embodiment—reference being had to FIG. 3 of the drawings—in the bottom of an outer vessel 30, beneath which is located a burner 31. The said vessel is otherwise similar to that hereinbefore described, the upper, opening top portions 32, 33 thereof being of enlarged diameter, and the former affording a seat 34 for the cooking vessel 35, as well as a spout 36. However, an axial duct 37 is provided to extend through said vessel as a guide for an indicator rod 38 attached at its lower end to an inverted cup element 39 designed to rest normally on the surface of liquid 40 to be vaporized. During the boiling of the vaporizable material, said inverted cup will be filled with vapors which will render it buoyant for indication purposes. If a sealed float were to be utilized instead, the substantial cooking temperatures might set up objectionable pressures therein.

In this embodiment, moreover, the cooking unit 35 is modified to the extent that, in addition to its perforated bottom portion 42, the unit is designed to receive, as by being supported on the ledge or seat 43 afforded thereby, a condensing unit 44 for vapors ascending through the cooking unit. An axial duct 45 aligned with the duct 37 extends through said unit 44 and receives also the rod 38 which continues beyond the top of the unit and its knob 48, for indicating purposes relatively to the volume of vaporizable liquid within the bottom of the vessel.

The said condensing unit 44 is filled preferably up to the bottom level, for example, of a spout 46, with cold water. The latter will serve to condense then vapors passing through the cooking unit 35 and food retained therein. Such fat vapors will thus condense at the undersurface of the bottom 47 of said condensing unit and drip down to the food below and the bottom of vessel 30 for reuse.

A frying action may thus be had with the novel cooker without objectionable fumes pervading the surroundings; aside from the fact that the heating medium is conserved.

An important feature of the novel cooker concerns the preparation of the family dinner. Normally, a large roast is cooked in an oven; and, as it may serve for several days, reheating of the same will be required on following days. To effect such reheating in the manner hereinbefore set forth, the "left-over" portion is placed in a container with a small amount of gravy and surrounded with the raw vegetables inside or outside of said container. This is then subjected for some ten or twelve minutes to the heated vapors, whereupon the whole dinner is ready to be served. Also, if there should be a delay in attendance of a guest, the cooker may be maintained for a substantial length of time at the desired temperature without objectionable effect on the food.

A further advantage attained by the use of the novel cooker is that there are no pots and pans to wash aside from the cooker which requires only a gentle soap rinsing. Also, there is no top of a stove which requires cleaning, since there are no "boiling-overs" or grease spatterings thereon from any pan.

I claim:
1. A cooking utensil for food comprising; an open top vessel having three different internal diameters, these diameters defined by two outwardly directed inner supporting flanges located intermediate its height, the lower portion of the vessel having the smallest diameter, a short height central portion having an intermediate internal diameter and the upper portion having the largest internal diameter; a removable cylindrical cooking unit with perforated bottom having three internal diameters defined by two outwardly directed inner supporting flanges, one flange intermediate its height and the other at its top, the lower section outside diameter of the cooking unit corresponding to the inner diameter of the intermediate portion of the open top vessel, the upper portion outside diameter of the cooking unit corresponding to upper portion internal diameter of the open top vessel and the top internal diameter defining a supporting flange for a cover or a cylindrical cup shaped vessel; said cooking unit resting, by its bottom, on the lower flange of the open top vessel; the lower portion of the cylindrical cooking unit and the upper portion of the open top vessel defining a closed insulating air space surrounding the cooking portion of the cooking unit.

2. A cooking utensil according to claim 1; the upper largest diameter portion of the open top vessel having a spout and a handle, centrally located, and the spout in communication with the heat insulating air space.

3. A cooking utensil according to claim 1; and the cooking unit at its top outwardly flange adapted to receive a cover with a knob for sealing the upper part of the cooking unit, and having a multiple series of vent openings and a handle just below the top flange.

4. A cooking utensil according to claim 3; and a third cylindrical cup shaped vessel having an upper end closed by a knobbed cover and having a spout and handle, nested in the top outward flange of the cooking unit and the cover.

5. A cooking utensil according to claim 4; and both cooking unit and cylindrical cup shaped vessel equipped with a central vertical tube and the cover with a central opening, said central opening extended through the center of the knob.

6. A cooking utensil according to claim 5; and an inverted cup floater level indicator disposed to float on the surface of the liquid at the bottom of the open top vessel; the floater having a central axial vertical rod that extends first through the axial central vertical tubes of the cooking unit and the cylindrical cup vessel and second through the axial central opening of the cover and knob; the axial vertical rod ending past the opening in the knob of the cover when the inverted cup level indicator is resting on the empty bottom of the open top vessel; when the inverted cup level indicator floats on the surface of the liquid at the bottom of the open top vessel, the central axial vertical rod will rise above the knob of the cover and so indicate the liquid level existing at the bottom of the open top vessel; the weight of the inverted cup level indicator plus that of the axial vertical rod being less than the buoyancy of the inverted cup.

References Cited in the file of this patent

UNITED STATES PATENTS

| 143,171 | Lundgren | Sept. 23, 1873 |
| 221,542 | Farrar | Nov. 11, 1879 |
| 458,417 | Eldredge | Aug. 25, 1891 |
| 554,996 | Erlam | Feb. 18, 1896 |
| 656,684 | Wiley | Aug. 28, 1900 |
| 952,572 | Meyer | Mar. 22, 1910 |
| 1,462,275 | Gammel | July 17, 1923 |

FOREIGN PATENTS

| 679,954 | Great Britain | Sept. 24, 1952 |